US005895636A

United States Patent [19]

Nguyen et al.

[11] Patent Number: 5,895,636
[45] Date of Patent: Apr. 20, 1999

[54] CATALYTIC COMPOSITIONS AND METHODS FOR SUPPRESSION OF HALOGENATION OF ORGANIC COMPOUNDS WITH OXIDATION PRODUCTS OF HALOGENATED ORGANIC COMPOUNDS IN GASEOUS EMISSION STREAMS

[75] Inventors: Pascaline H. Nguyen, Holmdel; James M. Chen, Edison; Chung-Zong Wan, Somerset; Shau-Lin Frank Chen, Piscataway; Zhicheng Hu, Edison, all of N.J.

[73] Assignee: Engelhard Corporation, Iselin, N.J.

[21] Appl. No.: 08/982,544

[22] Filed: Dec. 2, 1997

[51] Int. Cl.[6] .................. B01J 8/00; B01J 23/00; B01J 8/04; A62D 3/00

[52] U.S. Cl. .................. 423/245.1; 423/245.1; 423/213.5; 423/240 R; 423/240 S; 423/247; 502/302; 502/304; 502/328; 588/206; 588/207; 422/190; 422/193; 208/262.1; 208/262.5

[58] Field of Search .................. 502/302, 304, 502/328; 588/206, 207; 423/213.5, 240 R, 240 S, 245.1, 247; 422/190, 193; 208/262.1, 262.5

[56] References Cited

U.S. PATENT DOCUMENTS

| 3,767,453 | 10/1973 | Hoekstra . | |
|---|---|---|---|
| 3,785,998 | 1/1974 | Hoekstra | 252/477 R |
| 3,920,583 | 11/1975 | Pugh | 252/465 |
| 3,972,979 | 8/1976 | Kageyama | 423/240 |
| 4,053,557 | 10/1977 | Kageyama | 423/240 |
| 4,059,675 | 11/1977 | Yang et al. | 423/240 |
| 4,059,676 | 11/1977 | Yang et al. | 423/240 |
| 4,059,683 | 11/1977 | Lindberg et al. | 423/481 |
| 4,085,193 | 4/1978 | Nakajima et al. | 423/239 |
| 4,843,056 | 6/1989 | Matsumoto et al. | 502/302 |
| 5,064,803 | 11/1991 | Nunan | 502/170 |
| 5,113,027 | 5/1992 | Mainz et al. | 570/224 |
| 5,130,109 | 7/1992 | Wan | 423/213.2 |
| 5,283,041 | 2/1994 | Nguyen et al. | 423/240 |
| 5,578,283 | 11/1996 | Chen et al. | 423/240 R |
| 5,643,545 | 7/1997 | Chen et al. | 423/245.3 |
| 5,653,949 | 8/1997 | Chen et al. | 423/240 S |

FOREIGN PATENT DOCUMENTS

| WO 90/361287 | 8/1990 | WIPO | G06K 15/02 |

OTHER PUBLICATIONS

G.C. Bond and N. Sadeghi, "Catalyzed Destruction of Chlorinated Hydrocarbons" J. Appl. Chem. Biotechnol., (1975), 25, pp. 241–248.

James J. Spivy, "Complete Catalytic Oxidation of Volatile Organics", Ind. Eng. Chem. Res., (1987), 26, 2165–2180.

S. Chatterjee and H.L. Greene, "Oxidative Catalysis by Chlorinated Hydrocarbons by Metal–Loaded Acid Catalysis", Journal of Catalysts, (1991), 130, 76–85.

*Primary Examiner*—Gary P. Straub
*Assistant Examiner*—Melanie Wong
*Attorney, Agent, or Firm*—T. J. Shatynski

[57] ABSTRACT

Methods and chemical compositions for treating a gas stream comprising non-halogenated and halogenated organic compounds while suppressing halogenation of the non-halogenated organic compounds with the oxidation products of the halogenated organic compounds in the gas stream are disclosed. The gas stream in the presence of oxygen is contacted with the catalyst compositions of the invention to oxidize the non-halogenated and the halogenated compounds to form water, carbon dioxide, and halogen molecules ($Cl_2$, $Br_2$, etc.) and/or halogen acids such as HCl, HBr, etc. An advantage of the present compositions and methods is that halogenation or of the treated emissions is suppressed over a process operating temperature range 400 to 550° C.

9 Claims, 5 Drawing Sheets

MeBr/Benzene Conversion

MeBr/Benzene Conversion

MeBr/Benzene Conversion

MeBr/Conversion

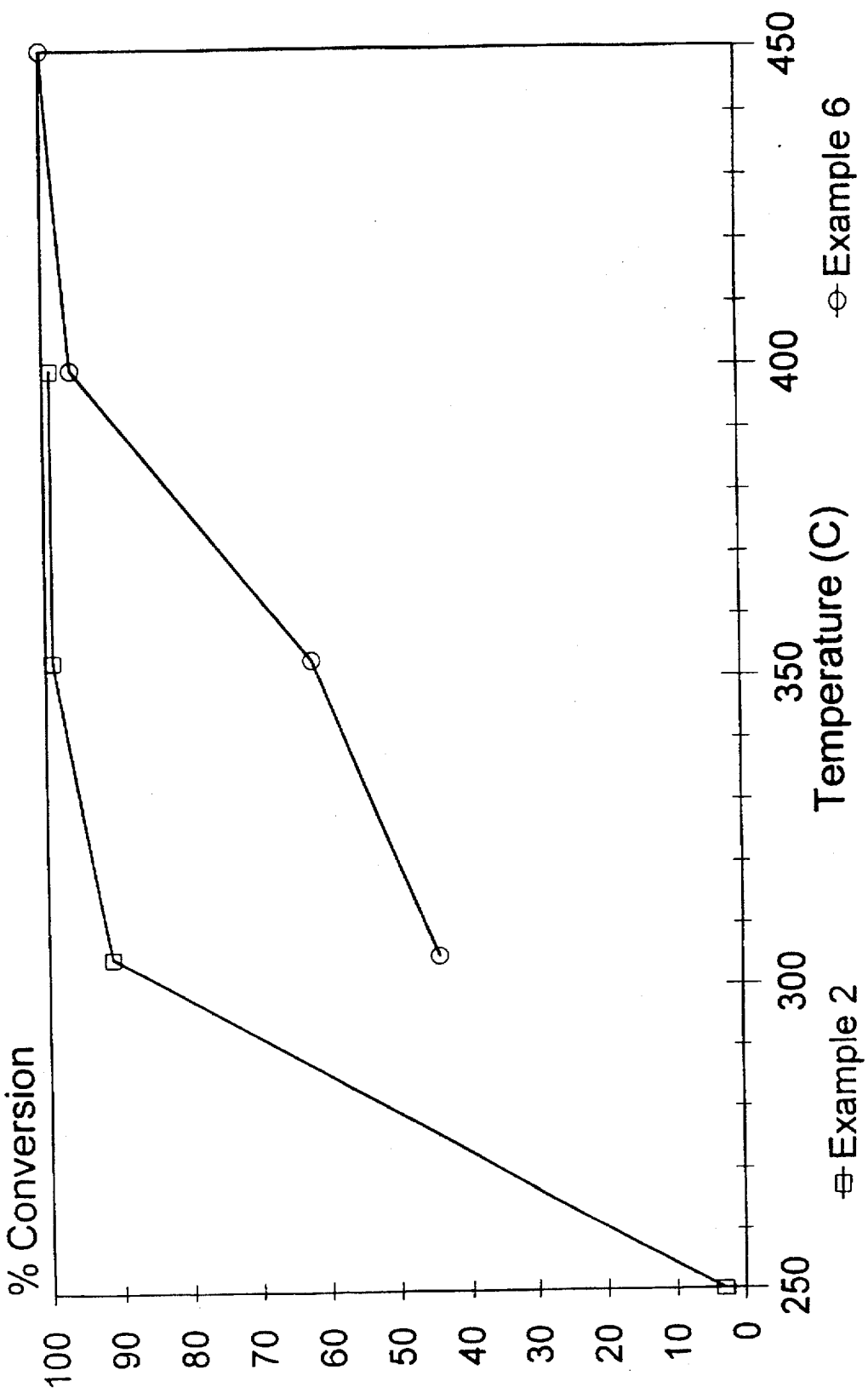

CATALYTIC COMPOSITIONS AND METHODS FOR SUPPRESSION OF HALOGENATION OF ORGANIC COMPOUNDS WITH OXIDATION PRODUCTS OF HALOGENATED ORGANIC COMPOUNDS IN GASEOUS EMISSION STREAMS

BACKGROUND OF THE INVENTION

1. Field of the Invention

This invention relates to methods and compositions for the catalytic oxidation of gaseous carbonaceous emissions, in particular, gaseous carbonaceous emissions that include halogenated compounds.

2. Description of Related Art

The treatment of gaseous emissions containing volatile organic compounds has been of increasing concern in recent years. Thermal incineration, catalytic oxidation and adsorption are commonly used for removing these pollutants. Thermal incineration requires high operating temperatures and high capital cost facilities. If the gaseous stream also includes halogenated compounds, thermal incineration can evolve toxic halogenated compounds under certain operating conditions. In some instances, adsorption by adsorbents such as carbon is an alterative; however, this process does not destroy the pollutants, but merely concentrates them. Furthermore, adsorption efficiency can be adversely impacted by fluctuating concentrations of the gaseous components.

Catalytic oxidation is an energy efficient and economical way of destroying gaseous organic emissions. It operates at significantly lower temperatures and shorter residence time than thermal incineration and requires smaller reactors made of less expensive materials.

Methods for the catalytic oxidation of non-halogenated organic and halogenated organic compounds are well known in the art. For example, in the article by G. C. Bond and N. Sadeghi, "Catalyzed Destruction of Chlorinated Hydrocarbons" *J. Appl. Chem. Biotechnol.*, 1975, 25, 241–248, it is reported that chlorinated hydrocarbons are converted to HCl and $CO_2$ over platinum on gamma alumina catalysts.

U.S. Pat. Nos. 3,972,979 and 4,053,557 describe the decomposition of halogenated hydrocarbons by oxidation over chromium oxide or a boehmite supported platinum.

U.S. Pat. Nos. 4,059,675, 4,059,676 and 4,059,683 describe methods for decomposing halogenated organic compounds using catalysts containing ruthenium, ruthenium-platinum and platinum, respectively, in the presence of an oxidizing agent at a temperature of at least 350° C.

The article by James J. Spivy, "Complete Catalytic Oxidation of Volatile Organics", *Ind. Eng. Chem. Res.*, 1987, 26, 2165–2180, is a review of the literature dealing with the heterogenous catalytic oxidation of volatile organic compounds.

The article by S. Chatterjee and H. L. Green, "Oxidative Catalysis by Chlorinated Hydrocarbons by Metal-Load Acid Catalysts", Journal of Catalysis, 1991, 130, 76–85, reports on a study of the catalytic oxidation of methylene chloride in air using supported zeolite catalysts H-Y, Cr-Y, and Ce-Y.

PCT international application No. PCT/US 90/02386 describes a catalytic process for converting or destroying organic compounds including organohalogen compounds using a catalyst which contains as a catalytic component titania. The preferred catalyst also contains vanadium oxide, tungsten oxide, tin oxide, and at least one noble metal selected from the group consisting of platinum, palladium, and rhodium characterized in that the vanadium oxide, tungsten oxide and noble metals are uniformly dispersed on the titania.

U.S. Pat. No. 5,283,041 (commonly assigned to assignee of the instant invention), hereby incorporated by reference, discloses an oxidation catalyst for treating a gas stream containing compounds selected from the group consisting of halogenated organic compounds, other organic compounds and mixtures thereof; the catalyst comprising a core material comprising zirconium oxide and one or more oxides of manganese, cerium or cobalt with vanadium oxide and, preferably, platinum group metal dispersed on the core material.

U.S. Pat. No. 5,643,545 (commonly assigned to assignee of the instant invention), hereby incorporated by reference, relates to treatment of streams containing halogenated organic compounds and volatile organic compounds (VOCs) with catalytic materials deposited on high acidity and/or low acidity supports.

U.S. Pat. Nos. 5,578,283 and 5,653,949, (commonly assigned to assignee of the present invention), hereby incorporated by reference, relate to treatment of gases containing halogenated organic compounds, non-halogenated organic compounds, carbon monoxide or mixtures thereof. Catalyst compositions useful in the treatment comprise at least one platinum group metal, zirconium oxide and at least one oxide of manganese, cerium or cobalt. A further composition disclosed uses the foregoing described components but which is substantially free of vanadium in a process for treating a gas stream containing at least one brominated organic compound.

While the foregoing references describe methods and compositions for treatment of streams containing carbonaceous compounds and halogenated organic compounds, there is no recognition of any problems which arise during the treatment of emission streams particularly those containing halogenated organic compounds and non-halogenated organic compounds such as methane and benzene. For example, emissions from production of terephthalic acid typically contain carbon monoxide, methane, methyl bromide, and hydrocarbons such as benzene and toluene. It has been observed that as catalysts age, their catalytic effectiveness decreases and to compensate for this decreased effectiveness, process temperatures are raised to complete the desired catalysis. However, for the case of terephthalic acid production, the increased process temperatures unfavorably results in bromination of methane and bromination of benzene. For example, it has been found that benzene bromination occurs at temperatures as low as 300° C. and that methane bromination occurs at temperatures low as 420° C. using a platinum-based catalyst. The bromination of methane has a deleterious effect on the overall conversion of methyl bromide. Additionally, bromination of benzene gives rise to bromobenzene, dibromobenzene, and tetrabromobenzene. The deleterious effects of forming these brominated benzenes is that these compounds are formed in the solid phase which cause plugging or blockage in process lines.

The present invention provides a solution to the aforesaid problems by offering methods and catalytic compositions which oxidize non-halogenated and halogenated organic compounds while suppressing halogenation of other gas stream compounds such as methane and benzene with the oxidation products of the halogenated compounds.

SUMMARY OF THE INVENTION

The present invention is related to a catalyst compositions and methods useful for treating gas streams containing halogenated compounds and carbonaceous compounds.

One embodiment of this invention relates to a method for oxidizing halogenated and non-halogenated organic compounds while suppressing halogenation of the non-halogenated compounds with oxidation products of the halogenated volatile organic compounds comprising the steps of: (a) providing a gas stream comprising halogenated and non-halogenated organic compounds; and (b) contacting the gas stream with a catalytic effective amount of a composition comprising platinum, palladium, or mixtures thereof supported on a high surface area alumina, wherein the alumina is stabilized with an alkaline earth metal oxide and a rare earth metal oxide, and is substantially free of ceria.

Another embodiment of this invention relates to a method for oxidizing halogenated and non-halogenated organic compounds comprising: (a) providing a gas stream comprising halogenated and non-halogenated organic compounds; and (b) contacting the gas stream with a catalytic effective amount of a composition comprising platinum, palladium, or mixtures thereof impregnated into a high surface area alumina, the alumina having been mixed with bulk cerium oxide.

Yet another embodiment of this invention relates to a method for oxidizing halogenated and non-halogenated organic compounds while suppressing the halogenation of the non-halogenated compounds with oxidation products of the halogenated organic compounds comprising the steps of: (a) providing a gas stream containing halogenated and non-halogenated organic compounds; (b) contacting and oxidizing the gas with a catalytic effective amount of a composition comprising platinum, palladium or mixtures thereof supported on alumina, ceria, titania, silica, manganese, zirconia or mixtures or composites thereof; and (c) further contacting the oxidized gas of step (b) with a catalytic effective amount of a composition comprising platinum, palladium, or mixtures thereof supported on a high surface area alumina, wherein the alumina is stabilized with an alkaline earth metal oxide and rare earth metal oxide, and is substantially free of ceria.

A further embodiment relates to a catalyst for oxidation of gaseous halogenated and non-halogenated organic compounds comprising platinum, palladium, or their mixtures supported on a high surface area alumina, wherein the alumina is stabilized with an alkaline earth metal oxide and a rare earth metal oxide, and is substantially free of ceria.

Another embodiment relates to a catalyst for oxidation of gaseous halogenated and non-halogenated organic compounds comprising a catalytic effective amount of platinum, palladium, or mixtures thereof, impregnated into a high surface area alumina, the alumina having been mixed with bulk cerium oxide.

Yet another embodiment of this invention relates to a catalyst for oxidation of gaseous halogenated and non-halogenated organic compounds comprising: a first zone of catalyst comprising platinum, palladium, or their mixtures supported on alumina, ceria, titania, silica, manganese, zirconia, or mixtures or composites thereof; and a second zone of catalyst comprising platinum, palladium or their mixtures supported on a high surface area alumina, wherein the alumina is stabilized with an alkaline earth metal oxide and a rare earth metal oxide, and/or mixtures thereof and is substantially free of ceria.

Advantages of this invention include oxidation of non-halogenated and halogenated organic compounds while suppressing halogenation of the non-halogenated compounds with the oxidation products of the halogenated organic compounds ranging from 400 to 550° C. A further advantage is that the catalysts of this invention perform well even in humid environments, e.g., in stream environments containing greater than 10% by mass steam.

BRIEF DESCRIPTION OF THE DRAWINGS

FIG. 5 shows comparative performance of a catalyst not part of this invention with the novel oxidation catalyst of this invention.

DESCRIPTION OF THE PREFERRED EMBODIMENTS

Figure 1:
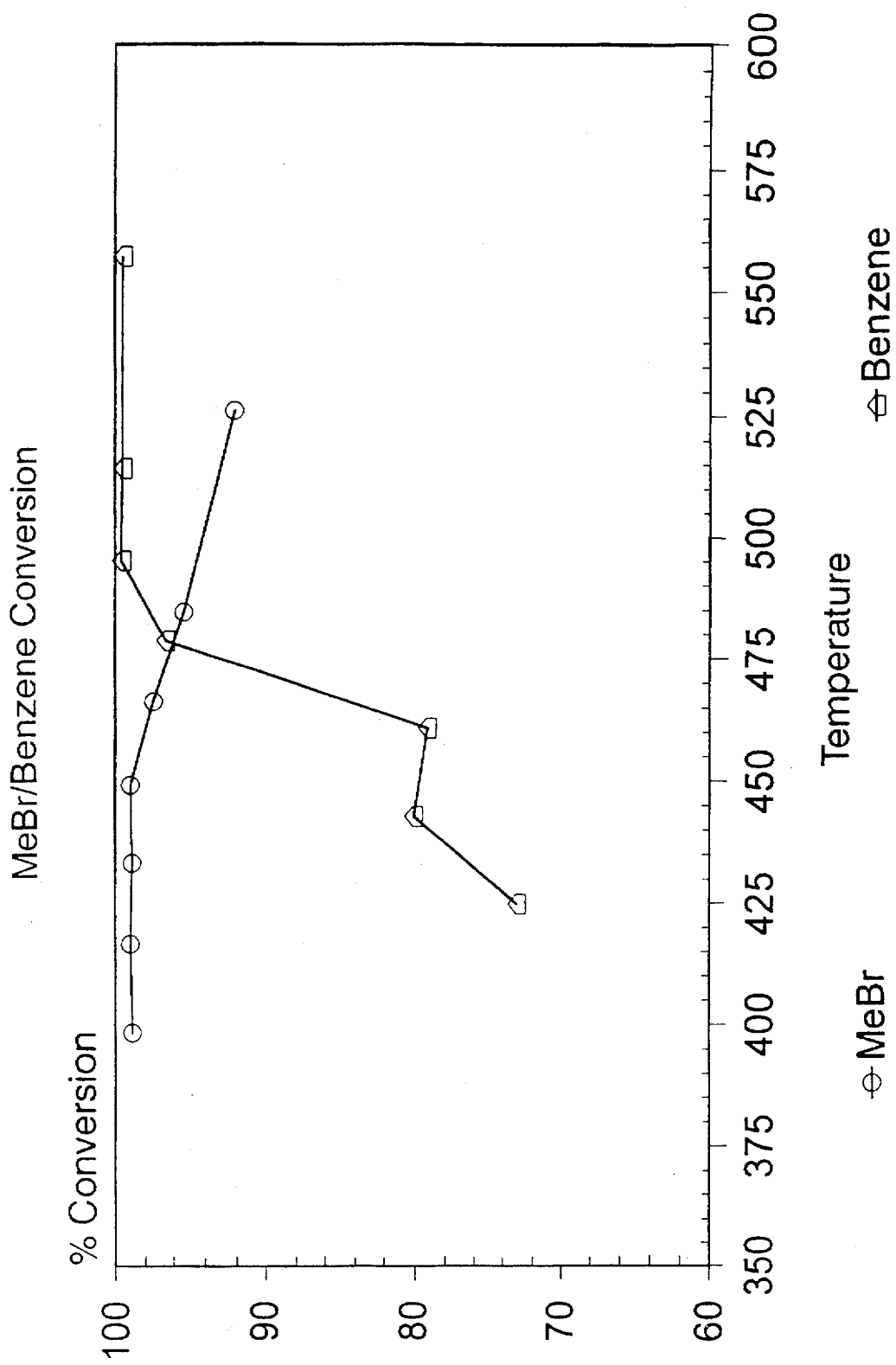
FIG. 1 shows benzene and methyl bromide conversion of a halogenation suppression catalyst of this invention.

This invention relates to catalytic compositions and methods for treating gas streams containing at least one carbonaceous compound including compounds selected from organic compounds and/or carbon monoxide and at least one halogen-containing compound, particularly halogenated organic compounds. Inorganic gaseous constituents such as nitrogen and minor constituents of air may also be present.

Non-halogenated organic compounds include carbon-containing molecules such as aliphatic and cyclic molecules. Such compounds can include hydrocarbon molecules, as well as heteromolecules which contain both carbon and non-carbon atoms.

Halogen-containing or halogenated compounds refer to compounds having at least one halogen atom in the molecule. Halogenated organic compounds, also referred to organohalogen compounds, refer to any organic compound having at least one halogen atom in the molecule.

For the purpose of the present invention, volatile organic compounds (VOC's) are organic compounds with sufficiently high vapor pressure to exist as a vapor in ambient air and which react in the atmosphere with nitrogen oxides in the presence of heat and sunlight to form ozone, and include both halogenated and non-halogenated volatile organic compounds.

In accordance with the present invention, at least some of the organic compounds and/or carbon monoxide contained in the introduced gas stream are converted in the presence of oxygen to comparatively innocuous compounds, such as $CO_2$ and $H_2O$ using the catalysts and methods of the invention. Preferably, at least 60% based on initial concentrations and more preferably substantially all of the organic compounds are converted. At least some of the halogenated organic compounds and preferably at least 60% based on the initial concentration, and more preferably substantially all of the halogenated organic compounds contained in the introduced gas stream are converted to compounds such as $CO_2$, $H_2O$ and halogen molecules ($Cl_2$, $Br_2$, etc.) and/or halogen acids, such as HCl, HBr, etc. The molecular halogen and halogen acids subsequently can be removed from the gas stream by conventional scrubbing technology. It is also noted that the term "oxidation products of the halogenated compounds" is intended to include intermediate oxidation products such as the free radicals and/or electrophiles that will form during the oxidation of the halogenated organic compounds.

As used herein, the term mixture is intended to describe components which are simple mixtures in the sense that when the mixture is examined by a technique such as x-ray diffraction (XRD), distinct characteristics of the individual mixture components are discernable. The term composite is intended to describe the instance when the components are combined in a manner in which XRD analysis reveals a single new compound, i.e., the individual characteristics of the mixture components are no longer discernable.

The expression "substantially free of ceria" is intended to describe amounts of ceria (cerium oxide) that do not detrimentally affect the performance of the halogenation suppression catalyst. Therefore, although the catalyst is preferably free of any detectable level of ceria, the catalyst should still be considered "substantially free of ceria" as long as it contains less than 1 weight % ceria (as $Ce_2O_3$)

Halogenation Suppression Catalyst

The catalysts of the present invention found to be effective in suppressing halogenation of the non-halogenated organic compounds with the halogen comprising oxidation products of the halogenated compounds (i.e., halogen molecules, free radicals, ionic molecules) are hereinafter referred to as halogenation suppression catalysts. These catalysts comprise a catalytic effective amount of palladium and/or platinum supported on a high surface area alumina which is stabilized with an alkaline earth metal and a rare earth metal oxide, and is substantially free of ceria.

Typical catalytic effective amounts of palladium range in catalyst loadings of from 1 to 3, preferably from 1.5 to 2.5, most preferably from 1.7 to 2.0 g/ft³.

The palladium may be supported on a high surface area alumina. The term high surface area is meant to describe surface areas comprising at least 80 m²/g, typically from 80 to 300 m²/g, preferably from 150 to 250 m²/g.

The alumina is "stabilized" or "promoted" with alkaline earth and rare earth metal oxides. The term "stabilized" or "promoted" is intended to describe materials which are known to improve the thermal durability of the catalytic layer without adversely affecting the structure or activity of the catalyzed and stabilized support material. Particularly useful alkaline and rare earth metal oxides are oxides of calcium, barium, strontium, radium, lanthanum, praseodymium or neodymium, and their combinations. Preferred are the oxides of barium, strontium, lanthanum, neodymium, and their mixtures.

Typical amounts comprising the halogenation suppression catalyst range from 1 to 20, preferably from 4 to 10% by mass of palladium and/or platinum; from 10 to 60, preferably from 20 to 40% by mass alumina; and from 1 to 40, preferably from 5 to 30% by mass alkaline earth and rare earth metal oxide.

Supplemental Oxidation Catalyst

In the practice of this invention, it has been found beneficial to employ a supplemental oxidation catalyst. The supplemental oxidation catalyst enables oxidation of the halogenated and non-halogenated organic compounds over a wider temperature window than achievable with the halogenation suppression catalyst alone.

The supplemental oxidation catalyst of the present invention comprises a catalytic effective amount of palladium and/or platinum. Typical catalytic effective amounts of palladium or platinum range in catalyst loadings of from 20 to 300, preferably from 50 to 250, most preferably from 100 to 200 g/ft³.

The palladium and/or platinum may be supported on materials such as alumina, ceria, titania, silica manganese, zirconia, and their mixtures. Additional suitable support materials include composites of alumina with zirconia; manganese with zirconia; zirconia with ceria; zirconia with silica; alumina with ceria; and alumina with barium and lanthanum. A preferred composite is manganese and zirconia.

Examples of suitable supplemental oxidation catalysts may be found in U.S. Pat. Nos. 5,283,041; 5,578,283; 5,643,545; and 5,653,949 the disclosures of which are incorporated by reference.

A particularly useful composition, believed to be novel and surprisingly found to be effective under highly humid environments (>10% by mass steam) comprises a catalytic effective amount of palladium and/or platinum preferably impregnated into high surface area alumina containing less than 1% by mass of rare earth and alkaline earth metal oxides. The impregnated alumina is then ball-milled and then mixed with bulk (i.e., powder) cerium oxide as opposed to colloidal ceria (i.e., cerium-based suspensions, e.g., cerium nitrate, cerium acetate, etc.), as demonstrated by example hereinafter.

Typical amounts comprising this catalyst range from 1 to 20, preferably from 4 to 10% by mass of palladium and/or platinum; from 5 to 60, preferably from 20 to 40% by mass alumina; and from 1 to 60, preferably from 5 to 40% by mass alkaline earth and rare earth metal oxide.

The preparation of the support materials for the catalysts of this invention may be by means well known to those of ordinary skill in the art and include physical mixtures, coagulation, coprecipitation or impregnation. The techniques for preparing the materials by coagulation and coprecipitation may be found, for example, in U.S. Pat. No. 4,085,193 which is incorporated by reference. Typically support materials prepared by the methods described are in the form of a fine powder. The support material can be used in powdered form. Alternatively, the support material in powdered form can be subsequently formed into larger particles and particulate shapes. The catalytic material may be applied to the support material prior to forming the support material into a particulate shape, or alternatively after the support is shaped into particulate form. The support material may be shaped into particulate or pellet form, such as extrudates, spheres and tablets, using methods well known in the art. For example, catalyzed support powder can be combined with a binder such as a clay and rolled in a disk pelletizing apparatus to give catalyst spheres. The amount of binder can vary considerably but for convenience is present from about 10 to about 30 weight percent.

The catalytic material can be dispersed onto the support materials by means well known in the art. A preferred method is impregnation, wherein the support material in particulate or powder form is impregnated with a solution containing a soluble compound of the catalytic metal or metals. The solution may be an aqueous solution, one using an organic solvent, or a mixture of the two. An aqueous solution is preferred. The soluble compounds of the metal (or metals) should decompose to the metal upon heating in air at elevated temperatures.

Suitable soluble platinum compounds are chloroplatinic acid, ammonium chloroplatinate, bromoplatinic acid, platinum tetrachloride hydrate, platinum dichlorocarbonyl dichloride, dinitrodiamino platinum, amine solubilized platinum hydroxide. Examples of suitable soluble palladium compounds are chloropalladic acid, palladium chloride, palladium nitrate, diamminapalladium hydroxide, tetraamminepalladium chloride, and palladium tetraamine diacetate.

One convenient method of impregnation is to place the uncatalyzed support material in the form of granules into a rotary evaporator which is partially immersed in a heating bath. The impregnating solution which contains an amount of the desired metal compound to provide the desired concentration of oxide or metal in the finished catalyst is now added to the support material and the mixture cold rolled (no heat) for a time from about 10 to 60 minutes. Next, heat is applied and the solvent is evaporated. This usually takes from about 1 to about 4 hours. Finally, the solid is removed from the rotary evaporator and calcined in air at a temperature of about 400° C.–600° C. for about 1 to 3 hours. If more than one catalytic metal is desired, they may be impregnated simultaneously or sequentially in any order.

Alternatively, the support material in powder form is placed into a planetary mixer and the impregnating solution is added under continuous agitation until a state of incipient wetness is achieved as known in the art of catalyst preparation. The powder is then dried in an oven for 4–8 hours and calcined from about 400° C.–600° C. for 1–3 hours.

The catalyst of the instant invention may be used in any configuration, shape or size which exposes it to the gas to be treated. For example, the supported catalyst can be conveniently employed in particulate form or the supported catalyst can be deposited as a coating onto a solid monolithic substrate. In some applications when the particulate form is used, it is desirable to provide a screen-like barrier that permits the flow of the gas stream but inhibits the movement of the solid particulates from one catalyst bed to the other.

In circumstances in which less mass is desirable or in which movement or agitation of particles of catalyst may result in attrition, dusting and resulting loss of dispersed metals, or undue increase in pressure drop across the particles due to high gas flows, a monolithic substrate is preferred. In the employment of a monolithic substrate, it is usually most convenient to employ the supported catalyst as a thin film or coating deposited on the inert substrate material which thereby provides the structural support for the catalyst. The inert substrate material can be any refractory material such as ceramic or metallic materials. It is desirable that the substrate material be unreactive with the catalyst and not be degraded by the gas to which it is exposed. Examples of suitable ceramic materials include sillimanite, petalite, cordierite, mullite, zircon, zircon mullite, spodumene, aluminatitanate, etc. Additionally, metallic materials which are within the scope of this invention include metals and alloys as disclosed in U.S. Pat. No. 3,920,583 (incorporated herein by reference) which are oxidation resistant and are otherwise capable of withstanding high temperatures. For the treatment of gases containing halogenated organic ceramic materials are preferred.

The monolithic substrate can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453, which are incorporated herein by reference. In a preferred embodiment, the honeycomb substrate has about 50 to about 600 cells per square inch of cross-sectional area. In an especially preferred embodiment, the honeycomb has about 100 to about 400 cells per square inch.

It is also within the scope of the invention that the monolith substrate consists of a crossflow-type monolith having a first plurality of passages defining a first flow path through the monolith and a second plurality of passages defining a second flow path through the monolith, segregated from the first flow path. The first and second catalyst beds of the dual bed design of this invention may be disposed in the respective first and second flow paths of the crossflow monolith.

If a monolithic form is desired, each layer of catalyst of this invention can be deposited sequentially onto the monolithic honeycomb carrier by conventional means. For example, a slurry can be prepared by means known in the art such as combining the appropriate amounts of the supported catalyst of this invention in powder form, with water. The resultant slurry is typically ball-milled for about 8 to 18 hours to form a usable slurry. Other types of mills such as impact mills can be used to reduce the milling time to about 1–4 hours. The slurry is then applied as a thin film or coating onto the monolithic carrier by means well known in the art. Optionally, an adhesion aid such as alumina, silica, zirconium silicate, aluminum silicates or zirconium acetate can be added in the form of an aqueous slurry or solution. A common method involves dipping the monolithic carrier into said slurry, blowing out the excess slurry, drying and calcining in air at a temperature of about 450° C. to about 600° C. for about 1 to about 4 hours. This procedure can be repeated until the desired amount of catalyst of this invention is deposited on said monolithic honeycomb substrate. It is desirable that each layer of the supported catalyst of this invention be present on the monolithic carrier in an amount in the range of about 1–4 grams of supported catalyst per $in^3$ of carrier volume and preferably from about 1.5–3 grams/$in^3$.

An alternative method of preparation is to disperse the catalytic metal or metals and such other optional components on a monolithic substrate carrier which previously has been coated with only uncatalyzed support material by the above procedure. The compounds of catalytic metal which can be used and the methods of dispersion are the same as described above. After one or more of these compounds have been dispersed onto the support material coated substrate, the coated substrate is dried and calcined at a temperature of about 400° C. to about 600° C. for a time of about 1 to 6 hours. If other components are desired, they may be impregnated simultaneously or individually in any order.

Sequential Catalyst Bed Embodiment(s)

This embodiment of the invention involves preferential contact of the gas stream containing the halogenated and non-halogenated organic compounds by a first catalytic bed and then by a catalytic second bed.

The first bed comprises the catalytic compositions described above as the supplemental oxidation catalyst.

The second bed comprises the catalytic compositions described above as the halogenation suppression catalyst.

Thus, the gas stream is preferentially contacted with the supplemental oxidation catalyst of the first bed and then the gas is contacted with the halogenation suppression catalyst of the second bed.

The process of using either the single or dual bed designs comprises contacting the gas stream at a temperature of about 100° C. to about 650° C. and preferably at a temperature of about 150° C. to about 450° C. with the first catalytic bed. This is followed by contact with the second catalytic bed comprising the halogenation suppression catalyst.

Processes of this invention, using either the single or dual bed designs, effectively treat, by catalytic reaction gaseous non-halogenated aliphatic and cyclic organic compounds including alkanes, alkenes and hetero compounds. Specific examples of such compounds commonly found in the waste gas streams of industrial processes include benzene, toluene, xylenes, phenol, ethyl alcohol, methyl acetate, methyl formate, isopropyl amine, butyl phthalate, aniline, formaldehyde, methyl ethyl ketone, acetone, etc.

The process of this invention, using either the single or dual bed device, may also effectively treat carbon monoxide contained in the introduced gas stream. The gas stream may consist essentially of carbon monoxide as the sole carbonaceous compound or the CO may be present as a component in a gas stream also comprising other carbonaceous compounds and/or halogen compounds.

The organohalogen compounds which can be treated, by catalytic reaction using the second catalyst, include halogenated compounds such as halogenated organic compounds. Some specific examples of halogenated compounds which can be reacted include chlorobenzene, carbon tetrachloride, chloroform, methyl chloride, vinyl chloride, methylene chloride, ethyl chloride, ethylene chloride, ethylidene dichloride, 1,1,2-trichloromethane, 1,1,1-trichloromethane, methyl bromide, ethylene dibromide, trichloroethylene, tetrachloroethylene, polychlorinated biphenyls, chlorotrifluoromethane, dichlorodifluoromethane, 1-chlorobutane, ethyl bromide, dichlorofluoromethane, chloroformic acid, trichloracetic acid and trifluoroacetic acid.

Many gas streams already contain enough oxygen ($O_2$) to oxidize all the pollutants, and most gas streams contain a large excess. In general, a large excess of oxygen greatly facilitates the oxidation reaction. In the event that the gas stream does not contain enough oxygen, oxygen, preferably as air, may be injected into the gas stream prior to contact with the first catalyst. The minimum amount of oxygen which must be present in the gas stream is the stoichiometric amount necessary to convert the carbon and hydrogen in the compounds present to carbon dioxide and water. For convenience and to insure that the oxidation reaction goes to completion, it is desirable that an excess of oxygen be present. Accordingly, it is preferable that at least two times the stoichiometric amount and most preferably at least five times the stoichiometric amount of oxygen be present in the waste gas stream.

It is also understood that the process of the present invention is not dependent on the concentration of the organic compounds and/or the organohalogen compounds. Thus, gas streams with a very wide concentration range of pollutants can be treated by the instant process. The process of this invention is also applicable to processes wherein liquid organohalogen compounds and organic compounds are vaporized and mixed with oxygen.

Particularly advantageous results are achieved with the dual and single bed designs of the invention wherein the feed gas stream comprises up to about 1% and typically 0.01 to 1% carbon monoxide, up to about 2000 ppm and typically 50 to 2000 ppm volatile organic compounds, up to about 2000 ppm and typically 50 to 2000 ppm halogenated organic compounds, and about six times the stoichiometric amount of oxygen. Water may be present in the gas feed in an amount from greater than 10% and examples demonstrate effective performance in amounts of 75% by mass water (i.e., steam).

The invention has been found to be particularly useful in treating vent gases derived from industrial processes that make phthalic acid compounds such as terephthalic acid (TPA), purified terephthalic acid, isophthalic (IPA) acid and alizarinic acid from xylene via catalytic reactions that use bromine as an initiator. Similarly, trimellitic anhydride is made by catalytic processes from trimethylbenzene using bromine as initiator. Further, catalyzed reactions making dicarboxylic acids from dimethyl naphthalene also use bromine. The desired acid end-product of these reactions typically are recovered by condensation, leaving a vent gas waste stream comprised of various volatile organic compounds, such as toluene, xylene, benzene, methyl formate, acetic acid, alcohol, carbon monoxide and methyl bromide. Conventional treatment of vent gases from such industrial processes involve thermal incineration or catalytic oxidation comprising a catalytic metal on a high acidity support. Compared with conventional catalytic control, the processes and devices of this invention provide the advantage of effective catalytic oxidation of the vent gas constituents at reduced operating temperatures and/or catalyst volume and with a reduced tendency for coke formation.

Another application of the invention involves treatment of volatile organic compounds and halogenated organic compounds, particularly chlorinated organic compounds such as chloroform and dioxin, derived from chlorine bleaching of pulp.

The requirement of the catalyst bed volume for a given application is normally referred to as volume hourly space velocity (VHSV), which is defined as the ratio of gaseous hourly flow rate to the catalyst bed volume. In the practice of this invention, the volume hourly space velocity (VHSV) can vary substantially preferably from about 1,000 to about 100,000 $hr.^{-1}$ and more preferably from about 5,000 to about 50,000 $hr.^{-1}$ based on gas rates calculated at standard temperature and pressure. For a fixed flow rate, the VHSV can be controlled by adjusting the size of the catalyst bed.

The bed volume and loading levels of the catalytic components may be specifically sized and tailored to particular applications. In dual bed configurations, the relative bed volume and catalytically active metal loading levels of the first and second catalyst beds may be varied according to the specific conversion requirements of the treatment application. For example, a dual bed device may have a relatively larger volume of the second catalyst than the first catalyst when it is desired to have a very high destruction efficiency of halogenated organic constituents of the gas feed; whereas a device providing high efficiency for non-halogenated compounds and a lesser efficiency for halogenated organics may require a larger volume of the first catalyst and a smaller bed volume of the second catalyst. The loading levels of the catalytic metal material based on the metal (or metal in a metal compound) can similarly be varied according to requirements of the application. When honeycomb substrate form is used, typical catalytic metal loading can range from about 10 to about 200 grams catalytic metal per cubic foot substrate.

Once the gas stream has been contacted with the catalyst and the pollutants destroyed, the catalyst treated gas stream may be further treated, if desired, to remove the halogen acid and any halogens which are formed during the conversion process. For example, the treated gas stream may be passed through a scrubber to absorb the acid. The scrubber may contain a base such as sodium or ammonium hydroxide which neutralizes the acids and solubilizes the halogens as basic hypolhalites and halides.

The catalysts of the invention are active and stable. The catalysts can be thermally regenerated to remove deposits of carbonaceous coke by means well known in the art. Typically, oxygen at a temperature of about 400–450° C. is introduced to the device by way of the inlet duct. The exothermic reaction of coke combustion can increase temperatures within the catalyst bed(s) to at least about 600° C. The catalysts of the invention and the activity of the catalysts is substantially unaffected by successive regeneration treatments.

Structural components of the devices of the invention, including the reactor chamber, transition cones, ducts and supporting elements are designed, using methods and materials well known in the art, to meet the severe operating conditions of temperature, pressure, turbulent flow and corrosivity encountered during catalytic operations and regeneration. Such conditions will vary substantially with the particular application. For example, the device may be designed to be subjected to operating pressures of ambient pressure (0 psig) to greater than 300 psig.

EXAMPLES

Various embodiments of the invention are described hereinbelow. The description and examples are not intended as limiting, as modifications will be apparent to those skilled in the art.

Example 1

A catalytic slurry containing palladium, alumina, neodymium, barium, lanthanum and strontium was prepared as follows. In a mixer there were mixed 61.94 g of alumina having a surface area of approximately 160 $m^2/g$; 27.72 g of $Pd(NO_3)_2$ solution (21.02% Pd); and 16 g of dilution water. To this wet powder, 32.22 g $Nd(NO_3)_3$ solution (29.7%); 29.73 g $La(NO_3)_3$ solution (27.1%); and 25.18 g zirconium acetate solution (20.0%) were added to a ball mill and mixed slightly to homogenize. Add 10.28 g $Sr(NO_3)_2$ crystals (49%) and 9.44 g $Ba(OH)_2$ crystals (48%) to the ball mill mix slightly to homogenize. Add dilution dionized water; 3.10 g glacial HOAc; and 0.19 g octanol to the ball mill. Ball mill to a particle size distribution of 90% less than 10 microns. This slurry contained a loading of 200 $g/ft^3$ Pd. The catalyst was prepared by dipping a 400 cells per square inch (CPSI) honeycomb in the slurry. After dipping, the excess slurry was blown out with an air gun. The sample was dried at 120° C. for one hour, and calcined at 500° C. for 1 hour. This procedure was repeated until the monolith had a 1.99 $g/in^3$ loading of catalytic material.

Example 2

Using the incipient wetness technique in a Por Nauta® mixer, impregnate 61.11 g of alumina (high surface area alumina (160$m^2/g$) stabilized with 1 mass % barium oxide and 1 mass % of lanthanum oxide) with 16.22 g of Pd $(NO_3)_2$ solution (20% Pd) and 45 g of water. This wet impregnated powder was then added into a ball mill with 80 g of water; 3.87 g of acetic acid; and 0.29 g of NXZ brand defoamer available from NOPCO. This mixture is then ball milled to particle size of approximately 90% <15 microns. At this point 35.64 g of ceria oxide powder (bulk) was added. The mixture is then ball milled until 90% of the particles are less than 10 microns. The mixture was then used to coat a 400 CPSI honeycomb to a loading of 2.00 $g/in^3$ of catalytic material. The honeycomb is then calcined at 500° C. for one hour.

Example 3

This example sequentially arranges the catalytic monolith of Example 2 in front of the catalytic monolith of Example 1.

Example 4

A catalytic slurry containing palladium, platinum, alumina, neodymium, barium, lanthanum and strontium was prepared as follows. In a mixer there were mixed 61.94 g of alumina having a surface area of approximately 160 $m^2/g$; 27.72 g of $Pd(NO_3)_2$ solution (21.02% Pd); 2.54 g of an aqueous amine-solubilized platinum hydroxide solution (15.1% Pt); and 16 g of dilution water. To this wet powder, 32.22 g $Nd(NO_3)_3$ solution (29.7%); 29.73 g $La(NO_3)_3$ solution (27.1%); and 25.18 g zirconium acetate solution (20.0%) were added to a ball mill and mixed slightly to homogenize. Add 10.28 g $Sr(NO_3)_2$ crystals (49%) and 9.44 g $Ba(OH)_2$ crystals (48%) to the ball mill mix slightly to homogenize. Add dilution dionized water; 3.10 g glacial HOAc; and 0.19 g octanol to the ball mill. Ball mill to a particle size distribution of 90% less than 10 microns. This slurry contained a loading of 200 $g/ft^3$ Pd and 20 $g/ft^3$ Pt. The catalyst was prepared by dipping a 400 cells per square inch (CPSI) honeycomb in the slurry. After dipping, the excess slurry was blown out with an air gun. The sample was dried at 120° C. for one hour, and calcined at 500° C. for 1 hour. This procedure was repeated until the monolith had a 1.99 $g/in^3$ loading.

Example 5

A catalytic slurry containing palladium, alumina, neodymium, barium, lanthanum and strontium was prepared as follows. In a mixer there were mixed 61.94 g of alumina having a surface area of approximately 160 $m^2/g$, 41.58 g of $Pd(NO_3)_2$ solution (21.02% Pd) and 16 g of dilution water. To this wet powder, 32.22 g $Nd(NO_3)_3$ solution (29.7%); 29.73 g $La(No_3)_3$ solution (27.1%); and 25.18 g zirconium acetate solution (20.0%) were added to a ball mill and mixed slightly to homogenize. Add 10.28 g $Sr(NO_3)_2$ crystals (49%), 9.44 g $Ba(OH)_2$ crystals (48%) to the ball mill mix slightly to homogenize. Add dilution dionized water, 3.10 g glacial HOAc, 0.19 g octanol to the ball mill. Ball mill to a particle size distribution of 90% less than 10 microns. This slurry contained a loading of 300 $g/ft^3$ Pd. The catalyst was prepared by dipping a 400 cells per square inch (CPSI) honeycomb in the slurry. After dipping, the excess slurry was blown out with an air gun. The sample was dried at 120° C. for one hour, and calcined at 500° C. for 1 hour. This procedure was repeated until the monolith had a 1.99 $g/in^3$ loading.

Example 6

160 g of $H_2O$ and 27.96 g of Pd nitrate solution was added to 197.23 g of alumina in a mixer. The alumina had a surface area of 160 $m^2/g$ and was stabilized using amounts of colloidal barium nitrate, colloidal cerium nitrate, and colloidal lanthanum nitrate solutions such that the stabilized alumina contained 5% BaO, 5% $Ce_2O_3$, and 5% $La_2O_3$ by mass, respectively. This wet powder is then added to a ball mill containing 120 g of $H_2O$, 0.5 ml of octanol and 10 g of acetic acid. The mixture was ball milled until 90% of the particles are less than or equal to 10 microns. Catalyst is then prepared by coating this mixture onto a 400 CPSI honeycomb.

Catalytic performance of the catalysts was determined by comparing their effectiveness in a feed gas containing 7000 ppm CO, 10 ppm benzene, 10 ppm toluene, 250 ppm methane, 3% $O_2$, 75% $H_2O$ and 30 ppm methyl bromide. The test pace velocity (the ratio of gas flow to catalyst volume) was maintained at a constant rate of 10,000 1/hr for each testing cycle. The temperature of the gaseous stream introduced to the reactor was controlled by a pre-heating unit. The temperature of the gaseous stream was incrementally increased and were held constant to allow the composition of the outlet gases to stabilize prior to measurement. Gas concentration measurements were made by GC analysis of gas samples taken from immediately before and after the reactors's inlet and outlet passages, respectively. The effectiveness of removing methyl bromide and benzene via conversion to less harmful compounds was then calculated with the following expression:

% Conversion=(Inlet conc.–Outlet conc.)/Inlet conc. * 100

The temperatures reported in the following tables and figures are based on the outlet temperature of the tested catalysts.

TABLE 1

| Temp. | MeBr Conversion | | | Benzene Conversion | | |
|---|---|---|---|---|---|---|
| (° C.) | Ex-1 | Ex-2 | Ex-3 | Ex-1 | Ex-2 | Ex-3 |
| 400 | 99% | 97% | 98% | <72% | 97% | 96% |
| 415 | 99% | 98% | 98% | <72% | 98% | 97% |
| 430 | 99% | 97% | 98% | 74% | 98% | 98% |
| 450 | 99% | 96% | 98% | 80% | >99% | >99% |
| 475 | 96% | 92% | >99% | 94% | >99% | >99% |
| 500 | 94% | <92% | 98% | >99% | >99% | >99% |
| 515 | 93% | — | — | >99% | — | — |
| 525 | 92% | — | — | >99% | — | — |

Figure 2:
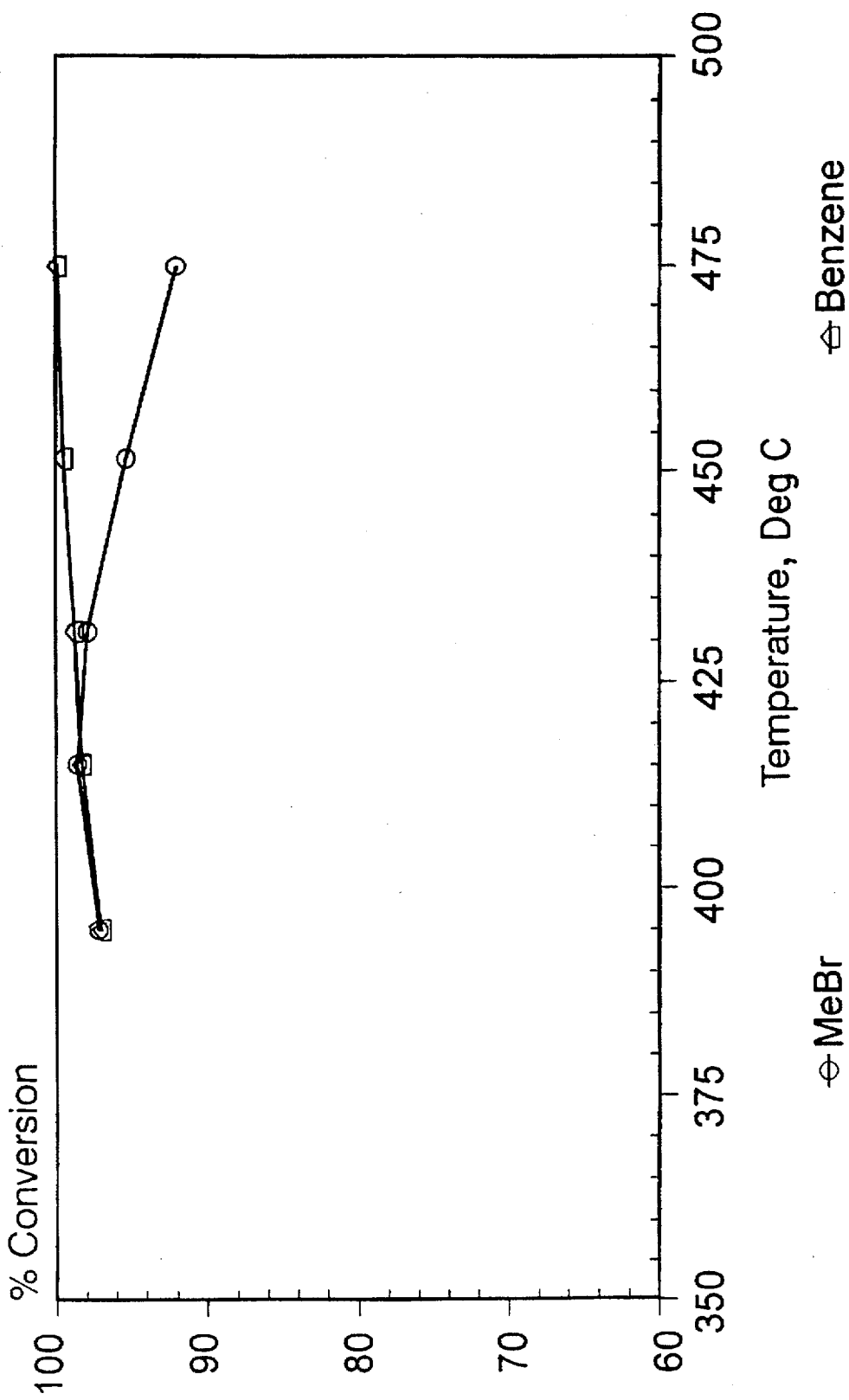
FIG. 2 shows benzene and methyl bromide conversion of a novel oxidation catalyst of this invention.
Figure 3:
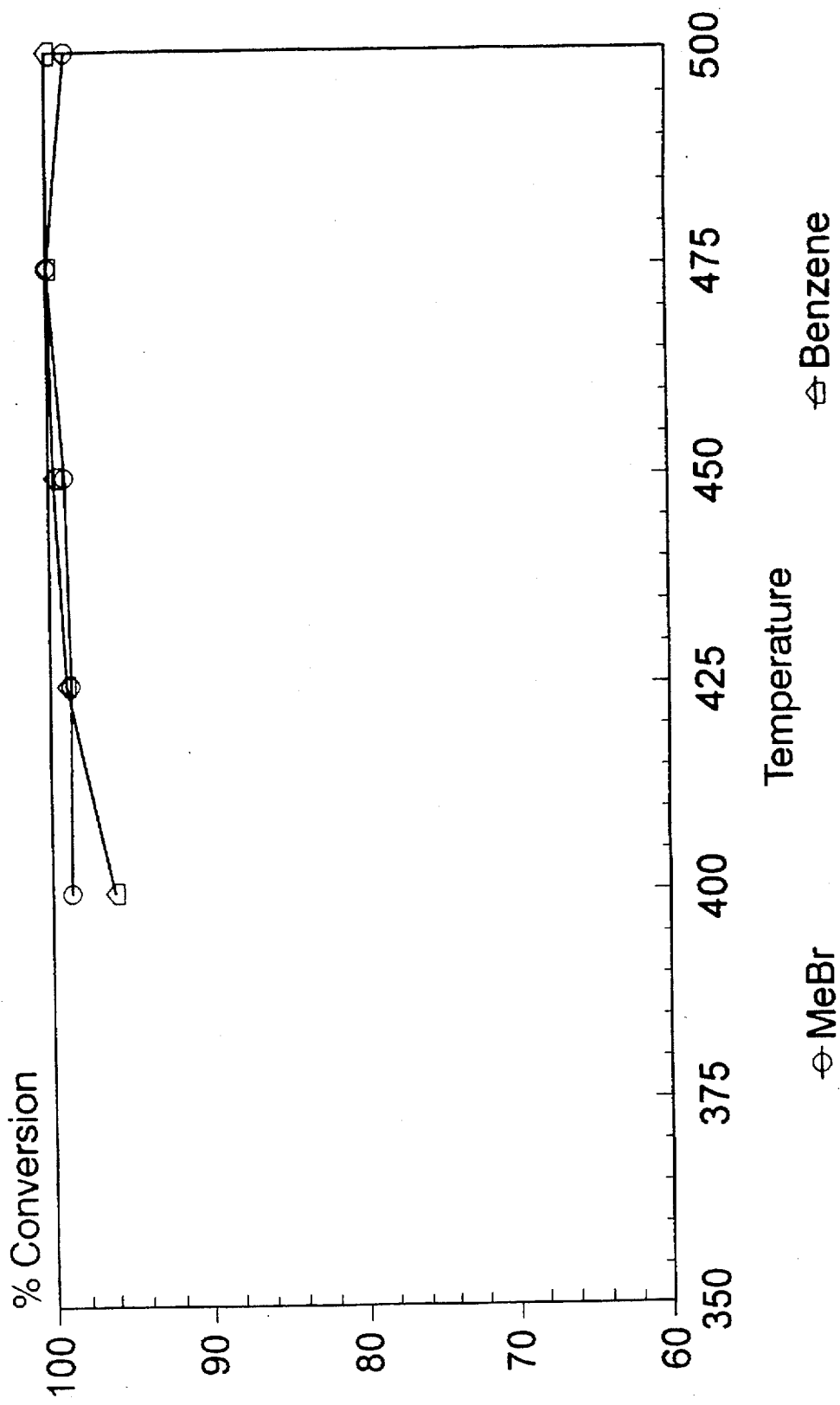
FIG. 3 shows benzene and methyl bromide conversion when the catalysts of FIG. 1 and FIG. 2 are combined.

Table 1 summarizes methyl bromide (MeBr) and benzene conversions for the catalysts of Examples 1 to 3 which correspond to FIGS. 1 to 3, respectively.

In the case of Example 1 (FIG. 1), t he example of a halogenation suppression catalyst of this invention, one sees that excellent MeBr conversion is obtainable over the temperature range of 400 to 525° C. Over the temperature range of 400 to 450° C., 99% MeBr conversion is achieved. At 475° C. to 525° C., MeBr conversion progressively decreases from 96 to 92%. However, benzene conversion of Example 1 behaves quite differently as compared to the MeBr conversion. Specifically, benzene conversion in the range from 400 to 450° C. does not exceed 80%. As temperature rises, improved benzene conversion is achieved above 80%, namely from the temperature of 475 to 525° C., benzene conversion increases from 94% to greater than 99%. Thus, the catalyst of Example 1 proves to be more efficient for conversion of MeBr (greater than 90% over range of 400 to 525° C.) but suffers in terms of low benzene conversion at lower temperature (i.e., ≦80% over temperature range of 400 to 450° C.).

In the case of Example 2 (FIG. 2), an example of the oxidation catalyst of the present invention, one sees benzene oxidation conversions starting at 97% and rising to >99% over the temperature range of 400 to 500° C. However, with regard to MeBr conversion, not as impressive results are achieved. Specifically, MeBr conversion starts at 97% (400° C.), increases to a maximum of 98% (415° C.), and then drops down to less than 92% (500° C.).

Example 3 (FIG. 3), demonstrates one inventive embodiment of this application, all-around excellent MeBr and benzene conversion when the feed gas is selectively contacted first with the catalyst of Example 2 followed by contact with the catalyst of Example 1. Thus, over the temperature range of 400 to 500° C., MeBr conversions ≧98% are achievable. This performance level is desirable particularly at the higher temperatures (i.e., 475 and 500° C.) as Example 3 outperforms either of the single catalysts by themselves while giving consistently high MeBr conversions of at least 98% over temperatures ranging from 400 to 450° C. Combined with these excellent MeBr conversion rates, benzene conversion rates are no less than 96% at a temperature of 400° C. and quickly rises to >99% at the temperature range of 450 to 500° C. Thus, the combination of first selectively contacting the feed gas with the catalyst of Example 2 followed with contact with the catalyst of Example 1 offer surprising results in view of the separate catalyst performance of Example 1 or Example 2.

TABLE 2

| | MeBr Conversion | | | |
|---|---|---|---|---|
| Temp. (° C.) | Ex-1 | Ex-2 | Ex-4 | Ex-5 |
| 400 | 99% | 97% | — | — |
| 425 | 99% | 97% | 99% | 99% |
| 450 | 98% | 96% | 99% | 96% |
| 475 | 96% | 92% | 96% | 94% |
| 500 | 94% | — | 94% | 91% |
| 525 | 92% | — | 86% | 81% |

Figure 4:
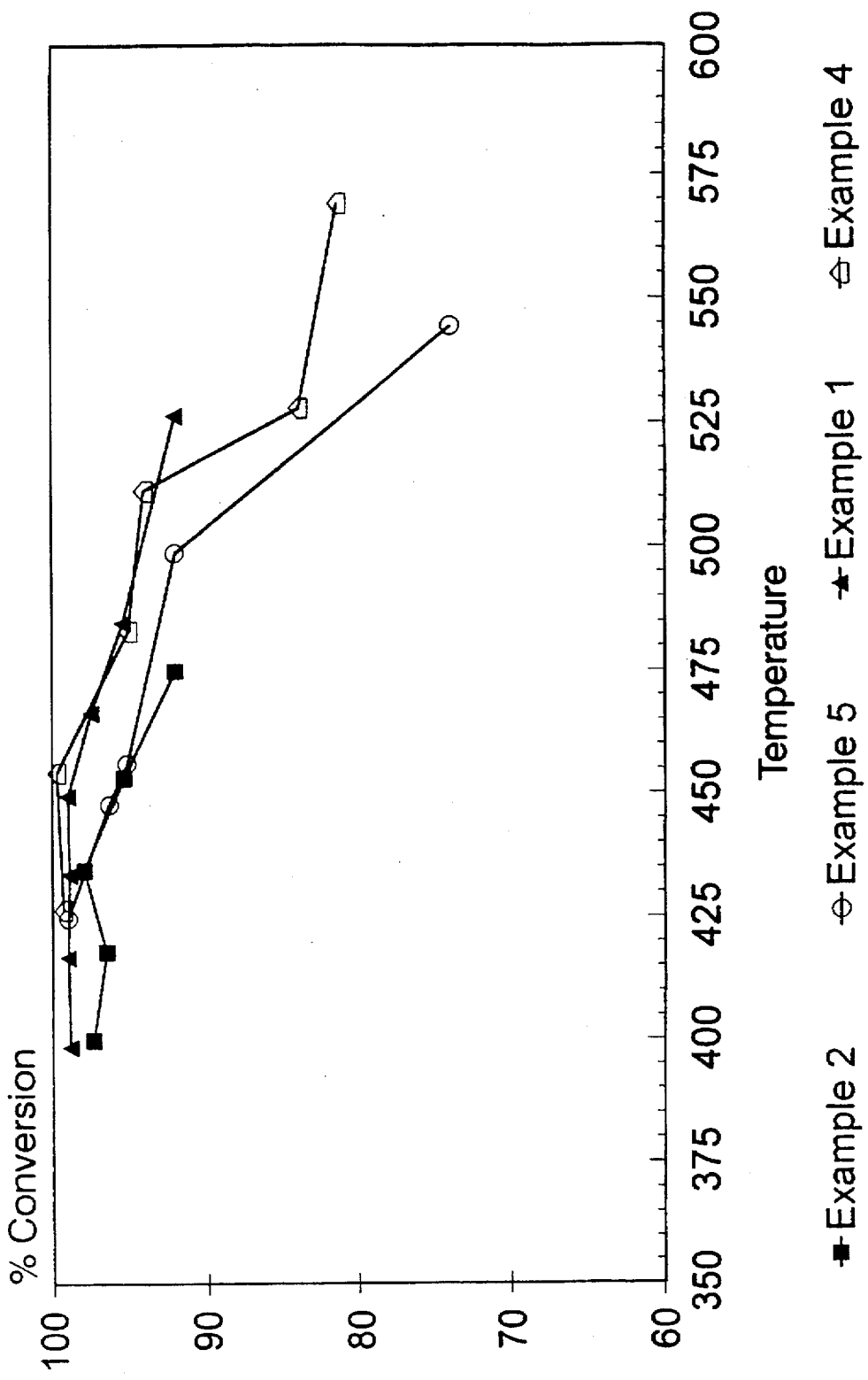
FIG. 4 shows comparative performance of catalysts not part of this invention with the halogenation suppression catalyst of this invention.

Table 2 (FIG. 4), summarizes MeBr conversion rates for Example 1 and compares the conversion rates with those of Examples 2, 4, and 5. It is the purpose of this table to demonstrate that catalytic compositions containing the required elements of the halogenation suppression catalyst of this invention, outperform catalysts that do not contain the required elements. Examples 1, 4, and 5 all contain a critical element for the halogenation suppression catalysts, namely being substantially free of ceria, while Example 2 contains ceria. As noted in Table 2, Examples 1, 4, and 5 give MeBr conversions at each temperature that outperform Example 2 except for Example 5 at 450° C. which equals performance of Example 2 at 96% MeBr conversion. It is noted that Example 4, which contains 20 g/ft³ of Pt with all the other components of Example 1 being the same, performs substantially equivalent to Example 1 over the measured temperature range of 425 to 500° C. Example 5, however, while containing the same components of Example 1 but with the total amount of palladium increased to 300 g/ft³ from 200 g/ft³, shows that there may be an optimum amount of palladium that should be added to achieve the overall best MeBr conversion rates.

TABLE 3

| | Benzene Conversion | |
|---|---|---|
| Temp. (° C.) | Ex-2 | Ex-6 |
| 300 | 85% | 44% |
| 325 | 93% | 51% |
| 350 | 99% | 60% |
| 375 | 99% | 78% |
| 400 | 99% | 96% |
| 425 | — | 98% |

Table 3 (FIG. 5), shows the oxidation capabilities of the novel oxidation catalyst i.e., Example 2 of this invention, compared to Example 6 which does not contain a critical element, i.e., bulk ceria. Thus, Example 6 does not contain bulk ceria, but does contain ceria in a colloidal form. Comparison of Example 2 to Example 6 shows that Example 2 substantially outperforms Example 6, particularly over the lower temperature range of 300 to 375° C. While Example 6 can be said not to contain an equivalent amount of ceria as compared to Example 2 (164 g/ft³ in Example 6 vs. 984 g/ft³ in Example 2), adding higher amounts of the colloidal ceria in Example 6 is not expected to have an improving effect as it has been observed that adding too much colloidal ceria will cause it to "float" out of solution. Thus, adding a comparable amount of colloidal ceria to Example 6 to reach the same level of bulk ceria in Example 2 is not possible.

Modifications, changes and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the inventions set forth herein, but rather should be limited by the advance of which the invention has promoted the art.

What is claimed is:

1. A method for oxidizing halogenated and non-halogenated organic compounds while suppressing halogenation of the non-halogenated compounds with oxidation products of the halogenated volatile organic compounds comprising the steps of:
   (a) providing a gas stream comprising halogenated and non-halogenated organic compounds; and
   (b) contacting the gas stream with a catalytic effective amount of a composition comprising platinum, palladium, or mixtures thereof supported on an alumina with a surface area from 80 m$^2$/g to 300 m$^2$/g, wherein the alumina is stabilized with an alkaline earth metal oxide and a rare earth metal oxide, and contains less than 1 weight % ceria (as $Ce_2O_3$).

2. The method of claim 1, wherein the alumina is stabilized with oxides of metals selected from the group consisting of barium, strontium, lanthanum, neodymium, and their mixtures.

3. The method of claim 2, wherein the alumina has a surface area of at least 80 m$^2$/g.

4. The method of claim 3, wherein the alumina has a surface area in the range of 150 to 250 m$^2$/g.

5. A method for oxidizing halogenated and non-halogenated organic compounds comprising:
   (a) providing a gas stream comprising halogenated and non-halogenated organic compounds; and
   (b) contacting the gas stream with a catalytic effective amount of a composition comprising platinum, palladium, or mixtures thereof impregnated into an alumina with a surface area from 80 m$^2$/g to 300 m$^2$/g, the alumina having been mixed with bulk cerium oxide.

6. The method of claim 5, wherein the alumina contains less than 1% by mass of rare earth and alkaline earth metal oxides.

7. A method for oxidizing halogenated and non-halogenated organic compounds while suppressing the halogenation of the non-halogenated compounds with oxidation products of the halogenated organic compounds comprising the steps of:
   (a) providing a gas stream containing halogenated and non-halogenated organic compounds;
   (b) contacting and oxidizing the gas with a catalytic effective amount of a composition comprising platinum, palladium or mixtures thereof supported on alumina, ceria, titania, silica, manganese, zirconia or mixtures or composites thereof; and
   (c) further contacting the oxidized gas of step (b) with a catalytic effective amount of a composition comprising platinum, palladium, or mixtures thereof supported on an alumina with a surface area from 80 m$^2$/g to 300 m2/g, wherein the alumina is stabilized with an alkaline earth metal oxide and rare earth metal oxide, and contains less than 1% weight % ceria (as $Ce_2O_3$).

8. The method of claim 7, wherein the composition of step (b) comprises platinum, palladium, or mixtures thereof impregnated into an alumina with a surface area from 80 m$^2$/g to 300 m$^2$/g, the alumina having been mixed with bulk cerium oxide.

9. The method of claim 8, wherein the alumina of step contains less than 1% by mass of alkaline earth and rare earth metal oxides.

* * * * *